(12) United States Patent
Barrett et al.

(10) Patent No.: US 8,787,917 B1
(45) Date of Patent: Jul. 22, 2014

(54) SELECTION OF WIRELESS NETWORK TRAVEL PATHS

(75) Inventors: Karen Barrett, Sydney (AU); Gordon R. Brunson, Broomfield, CO (US); Siobhan Buckley, Sydney (AU); Ciaran Gannon, Killara (AU); Muneyb Minhazuddin, Quakers Hill (AU)

(73) Assignee: Avaya Inc., Basking Ridge, NJ (US)

( * ) Notice: Subject to any disclaimer, the term of this patent is extended or adjusted under 35 U.S.C. 154(b) by 1208 days.

(21) Appl. No.: 11/257,909

(22) Filed: Oct. 24, 2005

(51) Int. Cl.
*H04W 40/00* (2009.01)
*H04W 74/00* (2009.01)
*H04M 11/00* (2006.01)

(52) U.S. Cl.
USPC ............ 455/445; 455/421; 455/423; 455/446

(58) Field of Classification Search
CPC ..... H04W 16/00; H04W 24/00; H04W 24/02; H04W 36/30; H04M 1/72516
USPC ................. 455/440–441, 421, 445, 423, 446; 701/210
See application file for complete search history.

(56) References Cited

U.S. PATENT DOCUMENTS

| | | | |
|---|---|---|---|
| 5,223,844 A | 6/1993 | Mansell et al. | |
| 6,226,589 B1 | 5/2001 | Maeda et al. | |
| 6,385,454 B1 * | 5/2002 | Bahl et al. | 455/450 |
| 6,466,685 B1 | 10/2002 | Fukui et al. | |
| 6,618,593 B1 | 9/2003 | Drutman et al. | |
| 7,016,707 B2 | 3/2006 | Fujisawa et al. | |
| 7,079,945 B1 * | 7/2006 | Kaplan | 701/208 |
| 7,103,367 B2 | 9/2006 | Adams et al. | |
| 7,373,144 B1 * | 5/2008 | Kirkpatrick et al. | 455/421 |
| 7,558,566 B2 * | 7/2009 | Koskinen et al. | 455/424 |
| 7,603,115 B2 * | 10/2009 | Banavar et al. | 455/421 |
| 7,653,715 B2 | 1/2010 | Bobde et al. | |
| 2002/0120687 A1 | 8/2002 | Diacakis et al. | |
| 2004/0066295 A1 | 4/2004 | Fellenstein et al. | |
| 2004/0193725 A1 | 9/2004 | Costa-Requena et al. | |

(Continued)

FOREIGN PATENT DOCUMENTS

EP 01521421 4/2005

OTHER PUBLICATIONS

Braden, R., et al; *RFC 2205: Resource ReSerVation Protocol (RSVP)—Version 1 Functional Specification*; Internet RFC/STD/FYI/BCP Archives; Internet Web Site: http://www.faqs.orq/rfcs/rfc2205.html; 79 pages; Sep. 1997.

Tehrani "Presence Meets the Cell Phone Thanks to Orative", available at http://www.tmcnet.com/tmcnet/columns/2004/072304rt.htm, Jul. 23, 2003, pp. 1-4.

(Continued)

*Primary Examiner* — Wesley Kim
(74) *Attorney, Agent, or Firm* — Sheridan Ross P.C.

(57) ABSTRACT

Mobile telephone user route mapping services and coverage area warning services and systems for providing such services are provided. Origination location and destination location information is entered, and a route between the locations along which wireless telephone system coverage is available is returned. If the returned route is less preferable than another possible route along which there are areas of poor coverage or no coverage, the provider of the wireless telephone system is informed, and this information can be used to identify areas in which improved coverage would most benefit mobile telephone users. A warning may also be provided to inform the parties to a call that a participant using a mobile telephone is about to enter an area of poor coverage or of no coverage. The described services may be offered in return for a fee paid to the service provider.

12 Claims, 4 Drawing Sheets

(56) References Cited

U.S. PATENT DOCUMENTS

| | | |
|---|---|---|
| 2004/0243307 A1* | 12/2004 | Geelen .......................... 701/213 |
| 2005/0054339 A1* | 3/2005 | Merritt .......................... 455/423 |
| 2005/0075116 A1 | 4/2005 | Laird et al. |
| 2005/0085257 A1 | 4/2005 | Laird et al. |
| 2005/0136912 A1 | 6/2005 | Curatolo et al. |
| 2006/0068731 A1* | 3/2006 | Seier .......................... 455/226.2 |
| 2006/0120281 A1 | 6/2006 | Schmidt et al. |
| 2008/0046306 A1* | 2/2008 | Egner et al. .................... 705/10 |

OTHER PUBLICATIONS

"Whereis—About", available at http://www.whereis.com/products/about-whereis/, printed Sep. 29, 2008, pp. 1-2.

"Whereis—On your mobile", available at http://www.whereis.com/products/on-your-mobile/, printed Sep. 29, 2008, pp. 1-4.

U.S. Appl. No. 11/463,523, filed Aug. 9, 2006, Fegan et al.

Background section of the above-captioned application (previously provided).

* cited by examiner

SELECTION OF WIRELESS NETWORK TRAVEL PATHS

FIELD

Selection of travel paths based on wireless network coverage quality and providing warning prior to entry into poor wireless network coverage areas are disclosed.

BACKGROUND

Wireless telephony networks or systems that support mobile telephones are widely used by persons while traveling. For example, cellular telephones are often used from cars or other means of transportation during commutes. However, the quality of wireless network coverage can vary. For example, due to political reasons, such as zoning, or geographic reasons, such as the presence of mountains or tall buildings, coverage in certain areas can be poor or non-existent.

In order to avoid dropped calls, users of mobile telephones who repeatedly travel the same route can learn where areas of poor or non-existent coverage are, and avoid being engaged in a call while traversing such areas. However, such prior experience is unavailable where a user is traveling a new route, has never attempted to complete or maintain a call within a particular area, or has simply forgotten that coverage in the area is poor or non-existent.

Wireless telephony network service providers often publish coverage maps illustrating areas in which network coverage is available. However, such maps typically have a very large scale, and do not show localized areas of poor or non-existent network coverage within larger areas that are advertised as providing network coverage. In addition, wireless telephony network service providers are reluctant to publicize "holes" in their network coverage. As a result, users generally must rely on their own experience or on information obtained from other users to determine whether wireless network coverage will be available along a route they are traveling or desire to travel.

As a result of areas of poor or non-existent coverage, a mobile telephone can be unable to initiate or receive calls. In addition, calls that are in progress can be dropped without warning. Furthermore, although network service providers maintain logs of dropped calls and where they occur, they have been unable to conveniently compile information regarding actual routes that network subscribers (i.e. mobile telephone users) take or would like to take.

SUMMARY

The present disclosure provides methods and systems that are directed to solving various of the problems and disadvantages of the prior art. In particular, a wireless telephony network service provider may provide a mobile telephone user with a suggested route or travel path between an origination point or location and a destination point or location. The suggested route is chosen to avoid areas of poor and/or non-existent network coverage. In addition, information regarding origination and destination points of mobile telephone users can be used by the service provider to determine where improved call coverage areas are most needed by service subscribers.

In addition, warning may be provided in advance of a mobile telephone user crossing from an area of adequate coverage to an area of poor or non-existent coverage. More particularly, the wireless telephony network service provider can determine or predict that a user is about to enter an area of poor or non-existent coverage from a prediction of the route that the user will take (or continue on), and from information known to the network service provider regarding the location of areas of poor or non-existent service coverage. The warning can be provided to the user of the mobile telephone, to a party in communication with the user of the mobile telephone, and/or to both the user of the mobile telephone and to a party in communication with the user of the mobile telephone.

Additional features and advantages of the methods and systems described herein will become more readily apparent from the following discussion, particularly when taken together with the accompanying drawings.

DETAILED DESCRIPTION

Figure 1:
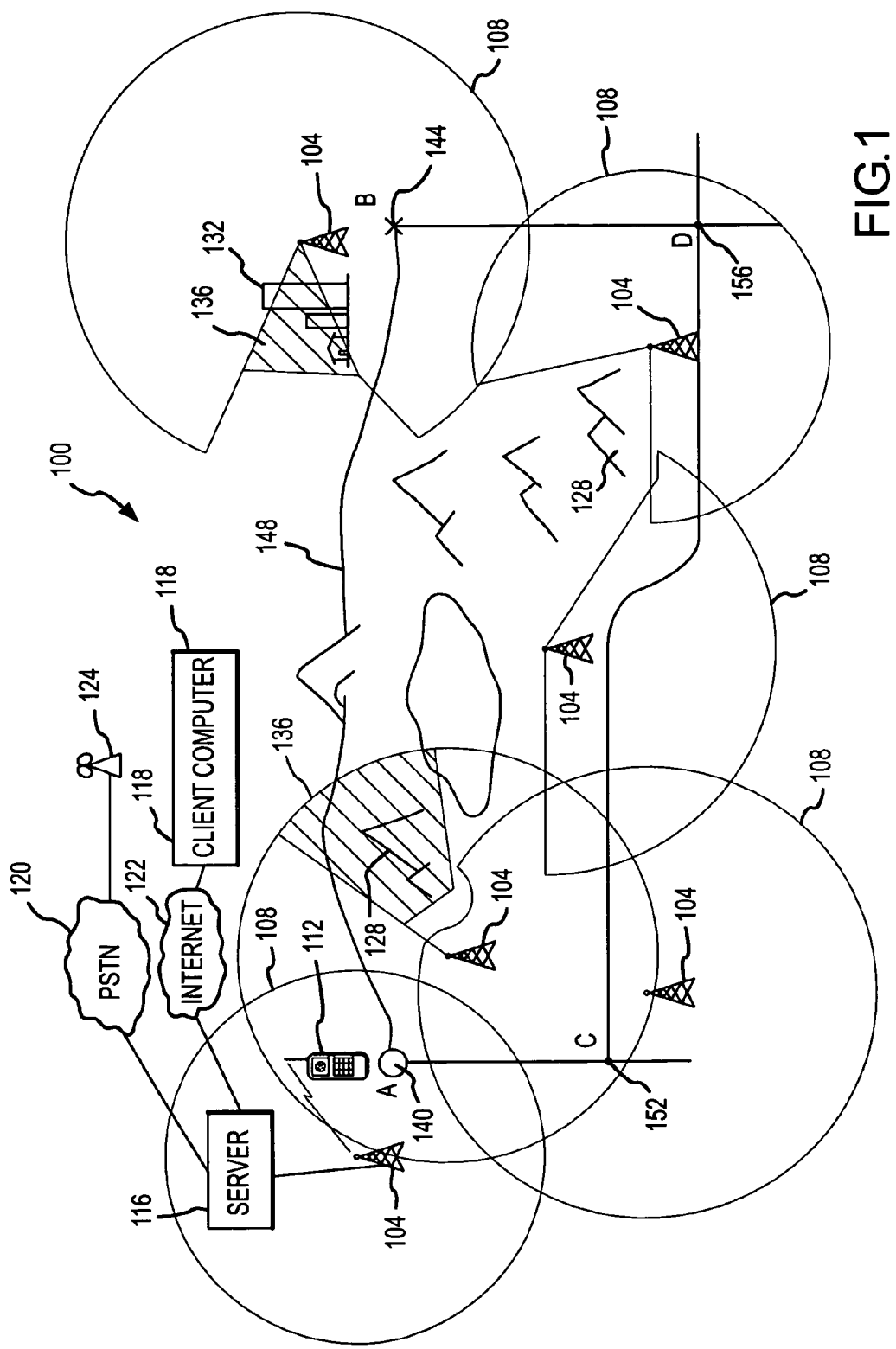
FIG. 1 is a schematic depiction of components and features of a wireless telephony network or system in accordance with embodiments of the present invention.

With reference to FIG. 1, components and features of a wireless telephony network or system 100 in accordance with embodiments of the present invention are illustrated. In general, the system 100 includes a number of mobile telephony service base stations 104. Each base station 104 is associated with a coverage area 108. In addition, the system 100 includes a wireless or mobile telephone 112, also referred to herein as a mobile communication endpoint, that is capable of wireless communication with a base station 104 while the mobile telephone 112 is in a coverage area 108 associated with the base station 104. While only one mobile telephone 112 is illustrated in FIG. 1, it can be appreciated that a typical wireless telephony network system 100 will include a number of mobile telephones 112. As can be appreciated by one of skill in the art from the description provided herein, the base stations 104 and mobile telephones 112 may comprise parts of a cellular telephone network.

The base stations 104 are generally in communication with one another through wireless or wireline connections. In addition, the base stations 104 are generally in communication with a wireless telephony network server 116, either directly or via other base stations 104. The wireless telephony network server 116 may perform a number of functions, such as interconnecting the base stations 104, and therefore wireless telephones 112, to the public switched telephony network 120. The system 100 may also include communication endpoints 124 that are interconnected to the wireless telephony network server 116 through the public switched telephony network 120. In accordance with further embodiments of the present invention, the server 116 may be interconnected to one or more client computers 118, such as mobile telephone 112 user accessible general purpose computers running web browser software, through a computer network such as the Internet 122.

As depicted in FIG. 1, the coverage areas 108 associated with the base stations are generally circular. However, certain irregularities in the coverage areas 108 can exist, for example due to geographic or environmental features, such as mountains 128 and buildings or other structures 132. As a result, there can be areas that provide poor wireless telephony network coverage 136. As used herein, poor coverage means that a mobile telephone 112 in a poor coverage area 136 will experience a compromised connection with a base station 104, with a resulting reduction in communication quality as compared to a normal coverage area 108, and/or with an increased risk that communications between the mobile telephone 112 and the base station 104 will be lost entirely (e.g. resulting in a dropped call). In addition, gaps may exist between coverage areas 108 for political reasons, such as zoning restrictions that limit where base stations 104 can be located, and economic considerations that prevent or discourage the wireless telephony network service provider from ensuring that there are no gaps between coverage areas. Therefore, the general service area of a wireless telephony network 100 typically includes areas of no coverage (i.e. areas that not within a coverage area 108 or a poor coverage area 136). While in an area of no coverage, a mobile telephone 112 will be unable to connect to a base station 104. In addition, if a mobile telephone 112 moves from an area of coverage 108 or poor coverage 136 into an area of no coverage while a call is in progress, that call will be dropped. Calls can also be dropped if a mobile telephone 112 moves from an area of coverage 108 into an area of poor coverage 136, or while traveling through an area of poor coverage 136 that for whatever reason can no longer support the call.

Figure 2:
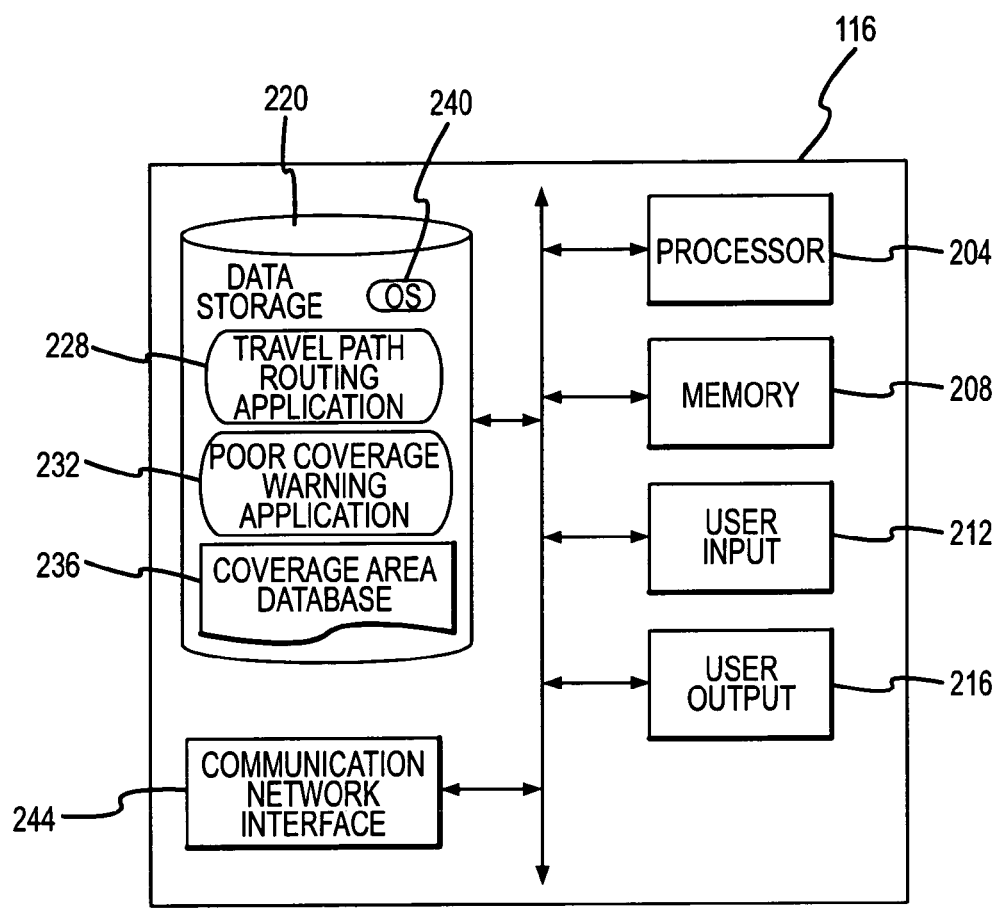
FIG. 2 is a schematic depiction of components of a wireless telephony network server in accordance with embodiments of the present invention.

With reference to FIG. 2, components of a wireless telephony system server 116 implementing some or all of the described travel path routing and/or call coverage warning features are depicted in block diagram form. The components may include a processor 204 capable of executing program instructions. Accordingly, the processor 204 may include any general purpose programmable processor, digital signal processor (DSP) or controller for executing application programming. Alternatively, the processor 204 may comprise a specially configured application specific integrated circuit (ASIC). A processor 204 generally functions to run programming code implementing various functions performed by the server 116, including travel path routing and coverage area warning features as described herein.

A server 116 may additionally include memory 208 for use in connection with the execution of programming by the processor 204 and for the temporary or long-term storage of data or program instructions. The memory 208 may comprise solid state memory resident, removable or remote in nature, such as DRAM and SDRAM. Where the processor 204 comprises a controller, the memory 208 may be integral to the processor 204.

In addition, the server 116 may include one or more user inputs or means for receiving user input 212 and one or more user outputs or means for outputting 216. Examples of user inputs 212 include keyboards, keypads, touch screens, touch pads and microphones. Examples of user outputs 216 include speakers, display screens (including touch screen displays) and indicator lights. Furthermore, it can be appreciated by one of skill in the art that the user input 212 may be combined or operated in conjunction with the user output 216. An example of such an integrated user input 212 and user output 216 is a touch screen display that can both present visual information to a user and receive input selections from the user. In accordance with embodiments of the present inventions, a user input 212 and user output 216 associated with the server 116 may be used by an administrator in connection with creating or loading instructions and other information related to the operation of the server 116.

A server 116 may also include data storage 220 for the storage of application programming and/or data. The data storage 220 may store various wireless telephony network routing and support applications. In addition, the data storage may store travel path routing application 228 instructions and poor coverage warning application 232 instructions. The data storage may also store coverage area 108, poor coverage area 136, and/or no coverage area data, for example as part of a coverage area database 236. Operating system software 240 may also be stored in the data storage 220. The data storage 220 may comprise, for example, a magnetic storage device, a solid state storage device, an optical storage device, a logic circuit, or any combination of any such devices. It should further be appreciated that the programs and data that may be maintained in the data storage 220 can comprise software, firmware, or hardware logic, depending on the particular implementation of the data storage 220.

A server 116 may also include one or more network interfaces 244. In general, a network interface 244 interconnects the server 116 to the public switched telephony network 120. A network interface 244 may also be provided to interconnect the server 116 to the wireless base stations 104. A network interface 244 may also interconnect the server 116 to the Internet 122.

Figure 3:
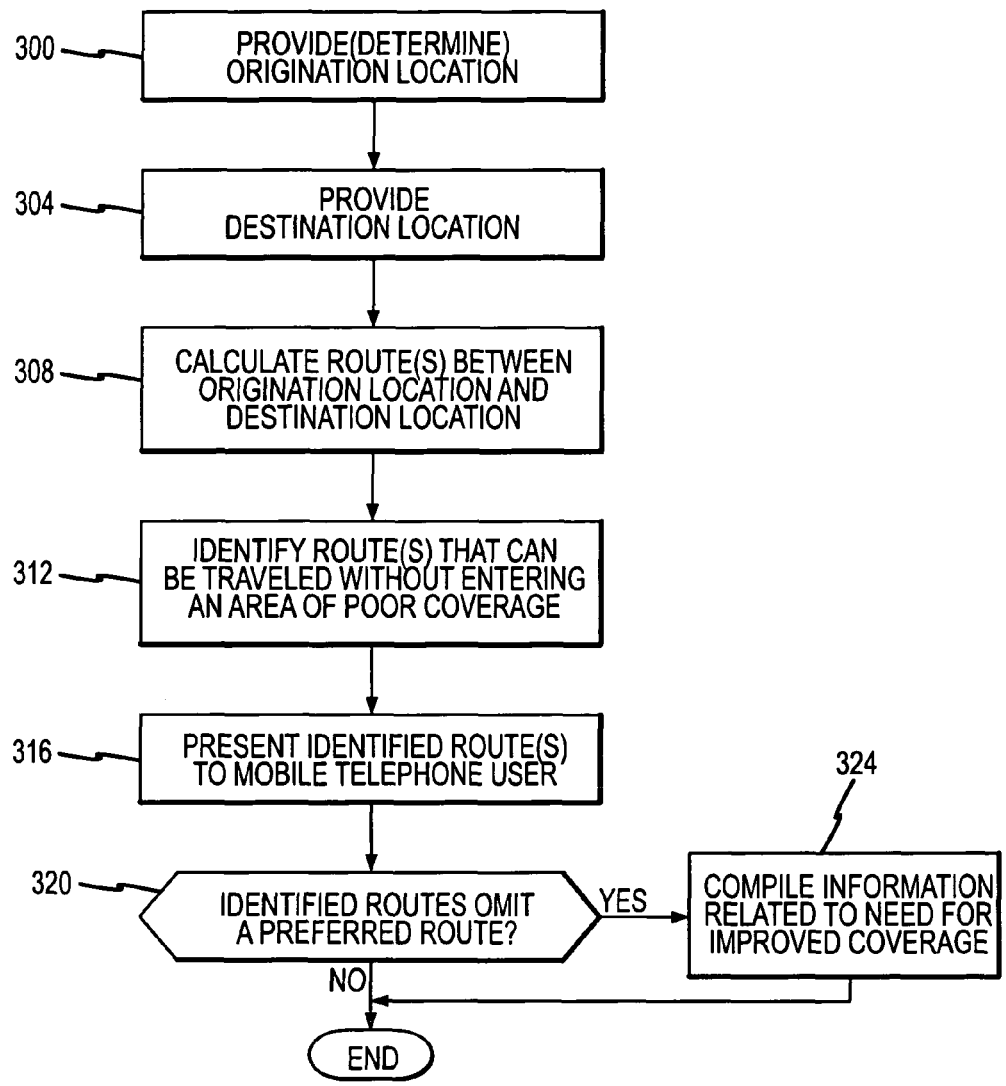
FIG. 3 is a flow chart depicting aspects of the operation of a wireless telephony system in accordance with embodiments of the present invention.

With reference to FIG. 3, aspects of the operation of a wireless telephony system 100 in accordance with embodiments of the present invention in connection with route planning or mapping are illustrated. At step 300, the origination point or location of a mobile telephone 112 is provided or determined. An example origination point or location is illustrated in FIG. 1 as location A 140. For instance, a mobile telephone 112 user may provide the telephony network server 116 with an intended origination point 140, for example through a web based interface accessed through the user's mobile telephone 112 or through a client purpose computer 118 interconnected to the server through the Internet 122. As a further example, a mobile telephone 112 user may provide the telephony network server 116 with the current location of the mobile telephone 112 as the origination point 140. Current location information can be provided through automatic location functions that provide the location of the mobile telephone 112 to the telephony network server 116 without requiring user entry of location information. A user may choose to enter the desired origination location 140, may choose from a list of previously entered origination locations 140, or may select the current location of the mobile telephone 112 as the origination location 140 by making selections from menus or interfaces provided by the mobile telephone 112 or a general purpose computer 118.

At step 304, the user of the mobile telephone 112 provides a desired destination location to the telephony network server 116. An example destination point or location is illustrated in FIG. 1 as location B 144. The destination location 144 may be entered or selected by the user through an interface provided by the mobile telephone 112, or through a client computer 118.

The telephony network server 116, through execution of the instructions comprising the travel path routing application 228, may then calculate a route or routes between the origination location 140 and the destination location 144 (step 308). The telephony network server 116 then identifies the route or routes that do not traverse any areas of poor coverage 136 or no coverage (step 312). For example, the route or routes that do not have any stretches that fall outside of a coverage area 108 are identified. That is, the route or routes along which the best coverage can be expected are identified. The identified route or routes are then presented to the user (step 316), for example through a display screen of the mobile telephone 112, as audible instructions presented through the audio output of the mobile telephone 112, or through user output provided though a client computer 118. In accordance with embodiments of the present invention, this route mapping service may be made available to the user of the mobile telephone 112 for an additional service fee.

At step 320, a determination can be made as to whether the identified route or routes omit a preferred route. A preferred route may be one that the user of the mobile telephone 112 indicates to the telephony network server 116 is preferred. A preferred route may also be one that the telephony network server 116 identifies as being more convenient, for example because it is more direct, takes less time to travel, or is shorter. An example of the exclusion of a preferred route is illustrated in FIG. 1. In particular, a mobile telephone 112 user who will be traveling from an indicated origination point A 140 to an indicated destination point B 144 would likely prefer to travel between the origination point A 140 and the destination point B 144 over the shortest, most direct route, depicted in FIG. 1 as road 148. However, there is a distance of road 148 along which there is poor coverage 136 or no coverage provided by the wireless telephony network system 100. Accordingly, the user is instead directed by the telephony network server 116 along a route that heads from origination location A 140 to first intermediate location C 152, and from the first intermediate location C 152 to a second intermediate location D 156. From the second intermediate location D 156 the user can complete the route to the destination point 144. As can be appreciated from the example of FIG. 1, the route that passes from point A 140 through points C 152 and D 156 on the way to the destination B 144 is always within one of the coverage areas 108, but is less direct and longer than the direct route between points A 140 and B 144.

Information related to the need for improved coverage may then be compiled if it is determined that the identified route or routes exclude a preferred route (step 324). The compiled information can then be used by the telephony network system 100 provider to identify areas in which the provision of improved coverage would most benefit its customers. After compiling information related to areas that could benefit from improved coverage (step 324), or after determining that no preferred routes have been excluded by the identified route or routes (at step 320), the process may end.

In accordance with still other embodiments of the present invention, a wireless telephony system 100 provider can allocate resources in order to guarantee quality of service along a route that is to be traveled by a mobile telephone user 112. For instance, for a service fee, the provider can ensure that base stations 104 along a route that is to be traveled by a particular mobile telephone 112 user reserve resources to allow the base stations 104 to support communications associated with that mobile telephone 112. The reservation of resources can be made end-to-end using the resource reservation protocol (RSVP). The RSVP protocol ensures that requested bandwidth and quality of service requirements are reserved end-to-end including all of the network devices in the path for the session originating from the mobile phone to the destination device. The signaling for RSVP setup happens end-to-end before the call is established. The calling device requests every network device along the path to the called device for dedicated bandwidth and quality of service requirements. Every device (including the called device) has to flag the request with a yes in both directions before the call can proceed. Once the call is completed then the reservation is torn down and these resources become available for other devices. The reservation of resources can also be made using other techniques or protocols.

Figure 4:
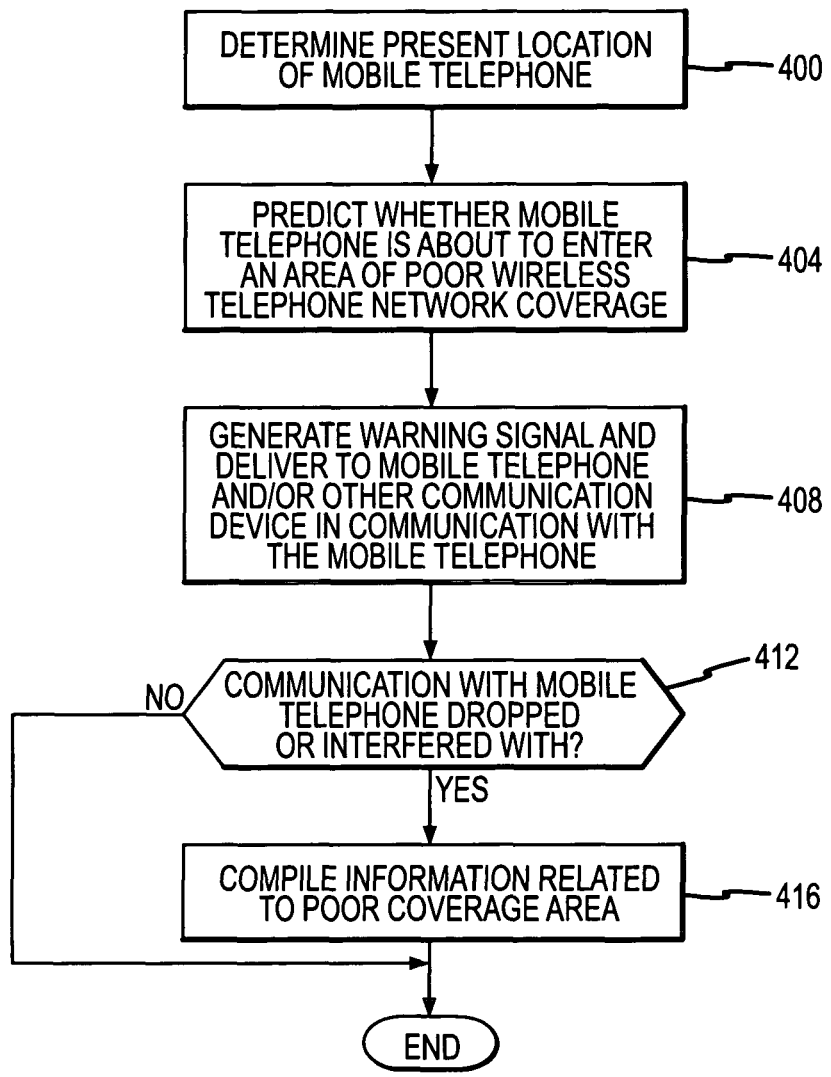
FIG. 4 is a flow chart depicting other aspects of the operation of a wireless telephony system in accordance with embodiments of the present invention.

With reference to FIG. 4, aspects of the operation of a wireless telephony system 100 in connection with providing a warning that an area of poor 136 or no coverage is about to be entered by a mobile telephone 112 in accordance with embodiments of the present invention are illustrated. At step 400, the present location of the mobile telephone 112 is determined. As can be appreciated by one of skill in the art, the location of the mobile telephone 112 can be determined from information related to the base station or stations 104 that the mobile telephone is in communication with, or from location information generated by other location determining technology, such as information from a global positioning system (GPS) receiver in the mobile telephone 112 that is provided to the telephony network server 116. A prediction is then made as to whether the mobile telephone 112 is about to enter an area of poor 136 or no wireless telephony network 100 coverage (step 404). This prediction can be made with reference to the direction of travel of the mobile telephone 112 or from known route information.

If it is predicted that the mobile telephone 112 is about to enter an area of poor 136 or no coverage (i.e. that the mobile telephone 112 is about to leave a coverage area 108 and enter an area not within a coverage area 108), a warning signal is generated and delivered to the mobile telephone 112 and/or another communication device 124 in communication with the mobile telephone 112 (step 408). By providing a warning to participants of a communication that one of the communication endpoints engaged in the call is about to be dropped, the participants can avoid wasting valuable time, for example during a conference call, talking on a subject that requires input from the party that is about to be dropped. The warning signal can be delivered to the mobile telephone 112 user through a text message and/or a voice message. Similarly, a user of another endpoint 124 engaged in the call with the mobile telephone 112 can be notified through a text message and/or a voice message. In accordance with embodiments of the present invention, such warning functions or services may be made available by the provider of the wireless telephony system 100 for a fee.

In connection with a communication that is dropped (step 412), information related to the area of poor 136 or no coverage can be compiled, for example by the wireless telephony network server 116 (step 416). In particular, the information can indicate to the wireless telephony system 100 provider the number of subscribers who are inconvenienced by dead spots in the system 100. The system 100 can then be improved, for example by adding base stations 104 to provide coverage 108 in areas where dead spots had inconvenienced a significant number of subscribers or users. After compiling information related to dead spots in the system, or if the call is not dropped, the process may end.

In accordance with further embodiments of the present invention, a wireless telephony system 100 may adapt to changes in the destination point of a mobile telephone 112 user. As a result of a change to the destination point, the user may wish to request an alternative route and/or request a reservation of resources along a route. In accordance with still other embodiments of the present invention, the wireless telephony system 100 provider can detect a change or deviation in route and request a new destination point (or in response to a new destination point identified by the user of the mobile telephone 112) and respond with new routing information and/or a reservation of resources along the new route.

Although exemplary embodiments of the present invention have been discussed that make use of a central wireless telephony network server 116 in connection with providing routing, coverage area demand information, and warning information, embodiments of the present invention are not so limited. For example, such functions and associated applications can be divided among a number of devices.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for facilitating mobile telephony service levels, comprising: establishing communications between a first endpoint comprising a first mobile telephone and a second endpoint comprising a second telephone; a processor determining one of a route and a predicted route of a user of said first mobile telephone; in response to said determining, said processor providing to said user of said first mobile telephone mobile, telephony network quality of service related information, wherein providing said quality of service related information includes delivering route instructions to said user of said first mobile telephone, wherein said route instructions provide a route that is selected with reference to mobile telephone network coverage parameters, wherein by following said route provided by said instructions said user of said first mobile telephone will avoid areas with poor mobile telephony network coverage, wherein said route instructions comprise a first route between an origination location and a destination location, wherein said first route is less preferable than a second route between said origination location and said destination location for reasons other than said quality of service related information, wherein said second route is not in said route instructions, wherein providing said quality of service related information further includes providing a warning that said user of said first mobile telephone will, in the future, enter an area with poor mobile telephony network coverage, to said user of said first mobile telephone and a user of said second telephone, when said second route is followed; generating information related to a measure of an importance of providing improved coverage along said second route based on said origination location and said destination location regarding a number of users of mobile telephones, wherein said first route is less preferable than said second route for reasons other than quality of service level for each of said number of users of mobile telephones; and improving coverage along said second route in response to information related to a need to provide improved coverage along said second route by allocating resources along said second route in order to guarantee a quality of service.

2. The method of claim 1, wherein said quality of service related information includes receiving said origination location and said destination location information regarding said user of said first mobile telephone.

3. The method of claim 1, wherein said first route is selected based on a greater predicted quality of service for said first mobile telephone along said first route as compared to a predicted quality of service for said first mobile telephone along said second route.

4. The method of claim 3, wherein said predicted quality of service along said second route is less than said predicted quality of service along said first route because said second route traverses an area of no or poor mobile telephony network coverage.

5. The method of claim 3, further comprising:
generating information related to a measure of the importance of providing improved coverage along said second route based on said origination location and destination location information received regarding said user of said first mobile telephone, and based on said first route being less preferable than said second route for reasons other than quality of service of said mobile telephony network.

6. The method of claim 1, wherein said at least one of route instructions and a warning are presented to said user of said second mobile telephone through a user interface of said second mobile telephone.

7. The method of claim 1, wherein said at least one of route instructions and a warning are presented to said user of said first mobile telephone through a user interface of a device other than said first mobile telephone.

8. The method of claim 1, wherein said at least one of route instructions and a warning are offered as a service available from a provider of said mobile telephony network in response to said provider of said mobile telephony network receiving payment from said user of said first mobile telephone.

9. A method for facilitating mobile telephony service levels, comprising: establishing communications between a first mobile telephone and a second mobile telephone;
a processor determining one of a route and a predicted route of a user of said first mobile telephone;
in response to said determining, said processor providing to said user of said first mobile telephone mobile, telephony network quality of service related information, wherein providing said quality of service related information includes delivering route instructions to said user of said first mobile telephone, wherein said route instructions provide a route that is selected with reference to mobile telephone network coverage parameters, wherein by following said route provided by said instructions said user of said first mobile telephone will avoid areas with poor mobile telephony network coverage, wherein said route instructions comprise a first route between said origination location and said destination location, and wherein said first route is less preferable than a second route between said origination location and said destination location for reasons other than quality of service of said mobile telephony network, wherein said second route is not in said route instructions, and wherein providing said quality of service related information further includes providing a warning to a user of said second mobile telephone, that said user of said first mobile telephone will, in the future, enter an area with poor mobile telephony network coverage when said second route is followed;
generating information related to a measure of an importance of providing improved coverage along said second route based on said origination location and said destination location regarding a number of users of mobile telephones, wherein said first route is less preferable than said second route for reasons other than quality of service level for each of said number of users of mobile telephones; and improving coverage along said second route in response to information related to a need to provide improved coverage along said second route by allocating resources along said second route in order to guarantee a quality of service.

10. The method of claim 9, wherein allocating said resources along said second route in order to guarantee said quality of service is accomplished by reserving resources in all base stations along said second route.

11. The method of claim 10, wherein said first mobile telephone requests all said base stations along said second route to allocate bandwidth and wherein said base stations and said second mobile telephone have to flag the request with a yes in both directions before the call can proceed.

12. The method of claim 11, wherein said allocated bandwidth is allocated before establishing said communications between said first mobile telephone and said second mobile telephone.

* * * * *